(12) United States Patent
Fan et al.

(10) Patent No.: US 9,559,481 B2
(45) Date of Patent: Jan. 31, 2017

(54) LARGE APERTURE UNIFORM-AMPLIFICATION LASER MODULE

(71) Applicant: Academy of Opto-Electronics, Chinese Academy of Science, Beijing (CN)

(72) Inventors: Zhongwei Fan, Beijing (CN); Tianzhuo Zhao, Beijing (CN); Weiran Lin, Beijing (CN); Ke Huang, Beijing (CN); Shuzhen Nie, Beijing (CN); Jin Yu, Beijing (CN)

(73) Assignee: Academy of Opto-Electronics, Chinese Academy of Science, Beijing (CN)

( * ) Notice: Subject to any disclaimer, the term of this patent is extended or adjusted under 35 U.S.C. 154(b) by 0 days.

(21) Appl. No.: 15/076,902

(22) Filed: Mar. 22, 2016

(65) Prior Publication Data

US 2016/0204563 A1    Jul. 14, 2016

Related U.S. Application Data

(63) Continuation of application No. PCT/CN2013/084003, filed on Sep. 23, 2013.

(51) Int. Cl.
*H01S 3/04* (2006.01)
*H01S 5/00* (2006.01)
(Continued)

(52) U.S. Cl.
CPC .............. *H01S 3/042* (2013.01); *H01S 3/025* (2013.01); *H01S 3/0405* (2013.01);
(Continued)

(58) Field of Classification Search
CPC ...... H01S 3/042; H01S 3/0405; H01S 3/1643; H01S 3/0407; H01S 3/025; H01S 3/0941; H01S 3/07; H01S 3/061
See application file for complete search history.

(56) References Cited

U.S. PATENT DOCUMENTS

| | | | | |
|---|---|---|---|---|
| 7,529,286 B2* | 5/2009 | Gokay | ................... | H01S 3/0941 372/69 |
| 8,594,147 B1* | 11/2013 | Burke | ..................... | F41A 19/63 372/34 |
| 2006/0203866 A1* | 9/2006 | Stephens | ............. | H01S 5/02423 372/43.01 |

FOREIGN PATENT DOCUMENTS

| | | | | |
|---|---|---|---|---|
| CN | WO 2008031287 A1 * | 3/2008 | ............. | H01S 3/025 |
| FR | EP 1463165 A1 * | 9/2004 | ............. | H01S 3/042 |
| IL | WO 2009109978 A1 * | 9/2009 | ............. | H01S 3/025 |

* cited by examiner

*Primary Examiner* — Yuanda Zhang
(74) *Attorney, Agent, or Firm* — Knobbe, Martens, Olson & Bear, LLP

(57) ABSTRACT

A large aperture uniform-amplification laser module including a longer, larger diameter crystal bar is disclosed. The laser module includes a ring-shaped pump bar structure, a crystal bar, a glass sleeve, and a structural component. The pump bar structure includes pump blocks composed of a bar, a cooling heat sink, and a cooling pipe. The bar is connected with the heat sink, and a cooling water channel is provided inside of the cooling heat sink. Heat sinks are provided with outlet pipes and an inlet pipes to communicate with water channels, which are connected in series through the cooling pipes to form a ring shape. The bar is close to a center axis of the ring-shaped pump bar structure. The crystal bar is provided in the glass sleeve. A plurality of the ring-shaped pump bar structures are sleeved on the glass sleeve along the length of the glass sleeve.

10 Claims, 6 Drawing Sheets

(51) Int. Cl.
*H01S 3/091* (2006.01)
*H01S 3/042* (2006.01)
*H01S 3/16* (2006.01)
*H01S 3/0941* (2006.01)
*H01S 3/02* (2006.01)
H01S 3/07 (2006.01)
H01S 3/06 (2006.01)

(52) U.S. Cl.
CPC .......... *H01S 3/0407* (2013.01); *H01S 3/0941* (2013.01); *H01S 3/1643* (2013.01); *H01S 3/061* (2013.01); *H01S 3/07* (2013.01)

LARGE APERTURE UNIFORM-AMPLIFICATION LASER MODULE

RELATED APPLICATIONS

Any and all priority claims identified in the Application Data Sheet, or any correction thereto, are hereby incorporated by reference under 37 CFR 1.57. This application is a continuation of International Application No. PCT/CN2013/084003, filed on Sep. 23, 2013, entitled "LARGE DIAMETER UNIFORM-AMPLIFICATION LASER MODULE," which is incorporated herein by reference in its entirety.

BACKGROUND

Field

The disclosed technology relates to laser devices, and more particularly to large aperture uniform-amplification laser modules.

Description of the Related Technology

The chemical formula of polycrystalline aluminium-yttrium garnet (YAG) is $Y_3Al_5O_{12}$, or $3Y_2O_3.5Al_2O_3$, where $Y_2O_3$ is 57.06 wt %, $Al_2O_3$ is 42.94 wt %. YAG is a laser host with an excellent combination of optical, mechanical and thermal properties. In laser devices with low and medium power, the quantity of yttrium aluminium garnet crystal (Nd:YAG) made of yttrium aluminium garnet far exceeds that of other laser material. Yttrium aluminium garnet crystals are prepared by melting and crystallizing certain proportions of Al2O2, $Y_2O_2$ and $Nd_2O_3$ in a single crystal furnace. The process of growing yttrium aluminium garnet crystals may include growing a crystal blank using the Czochralski method (CZ method). The thermal properties of yttrium aluminium garnet crystal make it a very suitable laser material.

The quality of crystals grown using the Czochralski method are adversely impacted by melt flow effects, transmitted vibrations, and temperature fluctuations. Due to characteristics of the crystal itself, the doping concentration of two ends of the crystal gradually rises as growth length increases. Usual methods for making a crystal bar process along the growth direction of the crystal blank, and the length of the crystal bar determines the difference of doping concentration on the crystal bar. For example, crystal bars with a diameter greater than or equal to 8 mm and a length greater than or equal to 100 mm have a difference of doping concentration of 20%-30%.

Commonly used laser amplification modules include a pump block composed of a bar, a cooling heat sink and a cooling pipe. A plate-like pump bar structure is composed of a plurality of connected pump blocks, and a plurality of plate-like pump bar structures arranged around a crystal bar in the laser amplification module. The distance from the bar on each pump bar structure to the crystal bar is the same and fixed, and the doping concentration is proportional to an absorption coefficient of the crystal bar to pump light. For a longer crystal bar with a larger diameter, the doping concentration gradient of the crystal bar on its main body may be too high, and the absorption coefficient of two ends of the crystal bar may be significantly different from that of the middle part, which makes the whole pump on the crystal bar nonuniform resulting in nonuniformity of the final gain output. Therefore, there is a need for large aperture laser modules with uniform amplification.

SUMMARY OF CERTAIN INVENTIVE ASPECTS

One aspect of the disclosed technology is a large aperture uniform-amplification laser module. The laser module includes a ring-shaped pump bar structure, an electric control block, a retractable screw, a crystal bar, a glass sleeve, and a structural component.

The pump bar structure includes a plurality of pump blocks, and each pump block is composed of a bar, a cooling heat sink, and a cooling pipe. The bar is connected with the cooling heat sink, and inside of which includes a cooling water channel. Two of the cooling heat sinks are respectively provided with an outlet pipe and an inlet pipe which communicate with the cooling water channel. From the cooling heat sink provided with the inlet pipe to the cooling heat sink provided with the outlet pipe, a plurality of the cooling water channels are connected in series through a plurality of the cooling pipes and form a ring shape. The bar is close to a center axis of the ring-shaped pump bar structure.

The crystal bar is provided in the glass sleeve, and a plurality of ring-shaped pump bar structures with the same diameter or different diameters are sleeved on the glass sleeve along the length of the glass sleeve. The glass sleeve is fixed, through the structural component, at a hollow part which is composed of a plurality of ring-shaped pump bar structures. An adjusted gap is between an outer wall of the glass sleeve and each bar of each pump bar structure.

One end of the retractable screw is rotationally connected with the electric control block, and the other end is connected with the cooling heat sink. The electric control block rotates, through an electrical signal provided from outside, the retractable screw to adjust the distance between the bar and the crystal bar.

The large aperture uniform-amplification laser module further includes a housing for respectively fixing each electric control block.

In an embodiment, a plurality of pump blocks composed of the bar, the cooling heat sink, and the cooling pipe are connected to form the ring-shaped pump bar structure. A plurality of ring-shaped pump bar structures with the same diameter or different diameters are sleeved on the glass sleeve loaded with the crystal bar. The adjusting gap is between the glass sleeve and the bar in each ring-shaped pump bar structure. Meanwhile, the electric control block is connected with the cooling heat sink. The retractable screw is provided on the electric control block. One end of the retractable screw is rotationally connected with the electric control block, and the other end is connected with the cooling heat sink. The electric control block is fixed through the housing and rotates, in response to the electrical signal provided from outside, the retractable screw to adjust the distance between the bar and the crystal bar.

In an embodiment, certain defects generated during growth can be remedied by adjusting and controlling the distance from the bar to the crystal bar through the electric control block, so as to form a small-scale uniform pump between a pump bar structure and a section of crystal bar corresponding to it, and further achieve uniform gain output of the laser module.

The relationship between the distance from the bar to the crystal bar and the pump uniformity characteristic can be determined by optical tracing simulation analyses and experimental tests. For example, for the yttrium aluminium garnet crystal with diameter of 15 mm, at the doping concentration of 0.8%, when the distance between the bar and the crystal bar is 8 mm, 10 mm, 12 mm and 14 mm, the obtained energy density distribution on a section of the crystal bar is shown in FIG. 1. When the distance is 8 mm, obviously there is serious energy overlapping bump in between; when the distance is 14 mm, the middle is too sunken.

The disclosed technology remedies certain defects generated during growth by controlling the distance between the bar and the crystal bar to achieve uniform pump in a certain absorption coefficient range. The disclosed technology achieves precise control of pump uniformity in the full range of the crystal bar and the final uniform gain amplification by adjusting the distance between the bar and the crystal bar through the electric control block fixed by the housing and precise control for uniform aiming at different injection pump powers. Thus, the large aperture uniform-amplification laser module provided by the disclosure is capable of using a longer crystal bar with a larger diameter to perform laser amplification and achieve the aim of uniform gain output.

Figure 1:
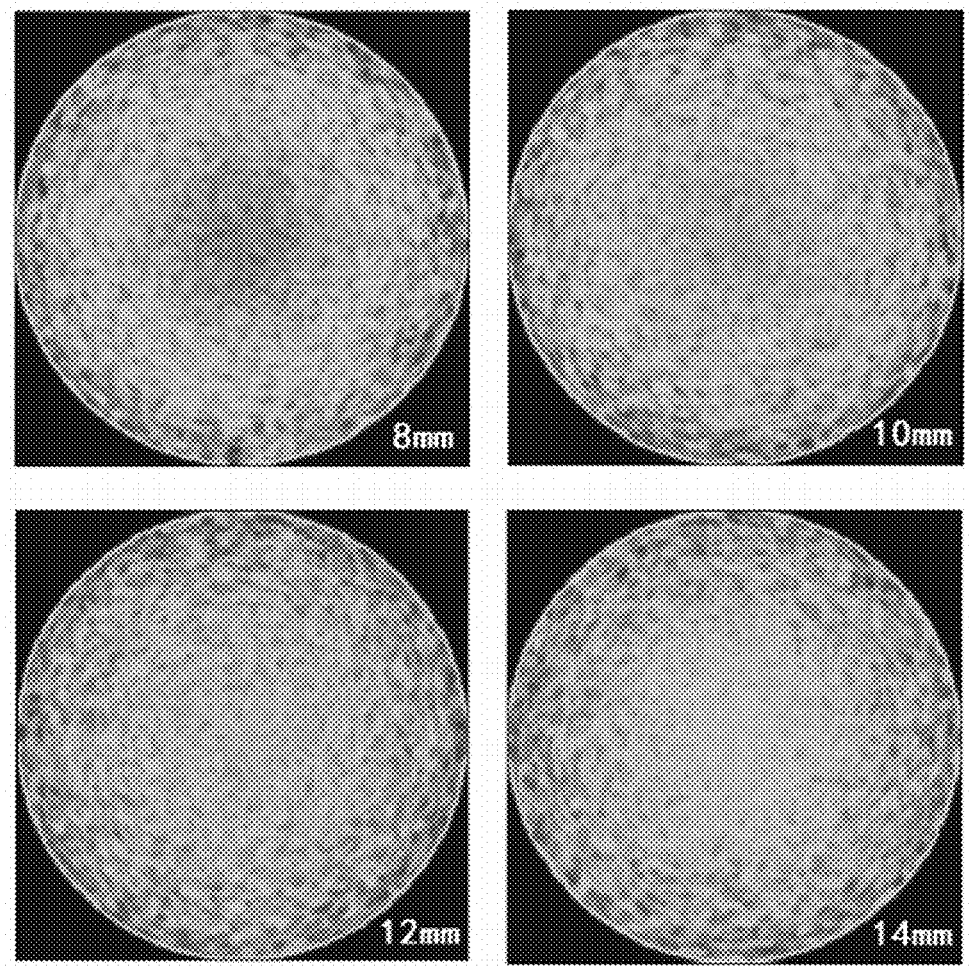
FIG. 1 is a diagram of energy density distribution on a section of a crystal bar provided by the disclosure.
Figure 2:
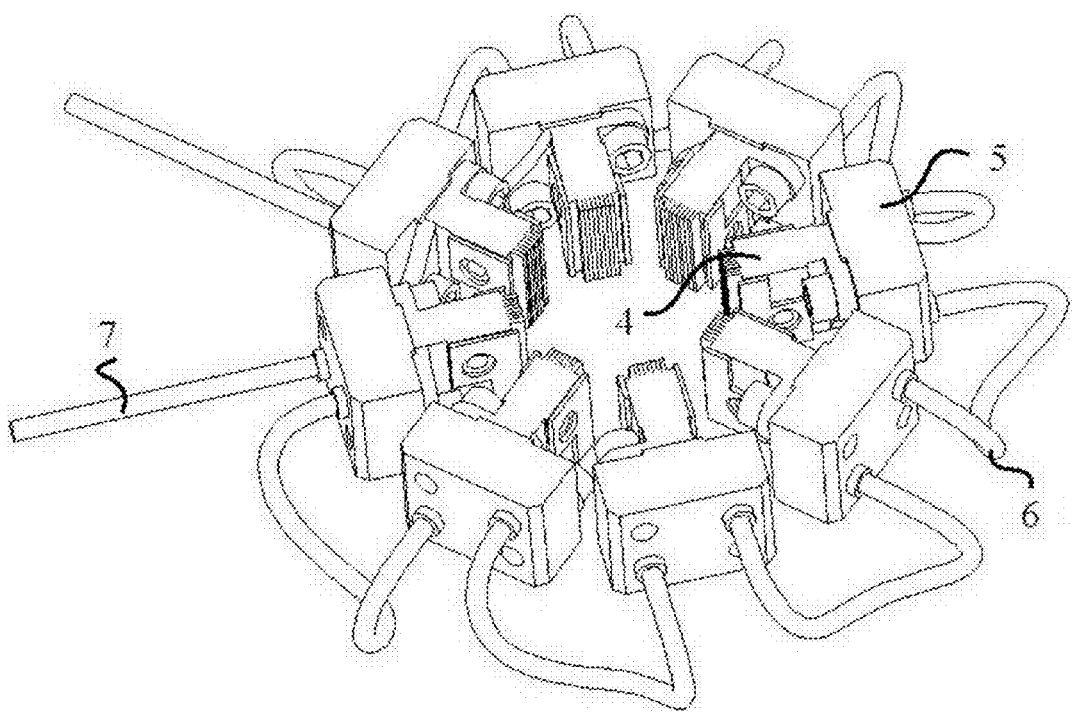
FIG. 2 is a structure view of a pump bar structure composed of 8 pump blocks.
Figure 3:
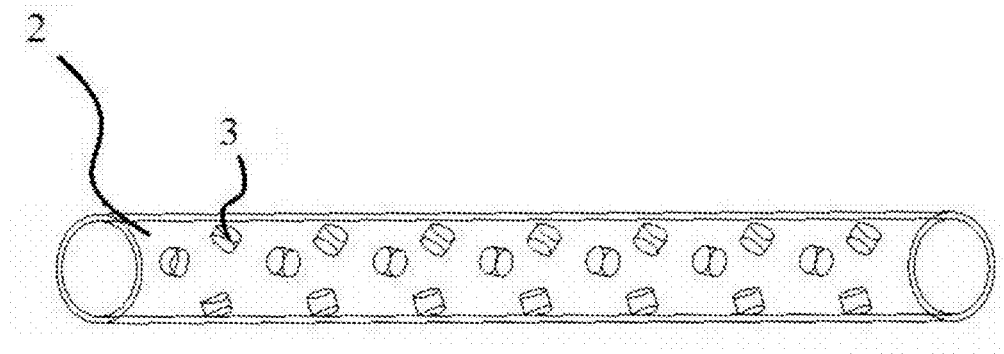
FIG. 3 is a structure view of a glass sleeve whose inner wall is provided with a bump.
Figure 4:
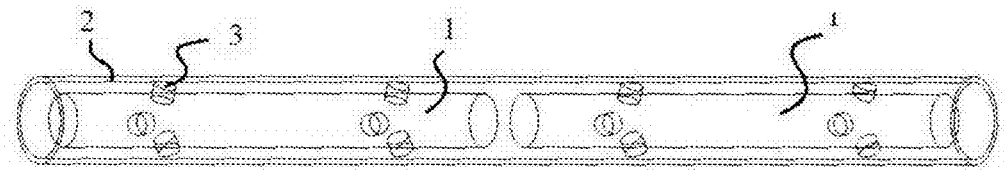
FIG. 4 is a combination structure view of a glass sleeve whose inner wall is provided with a bump and a crystal bar with composite structure.
Figure 5:
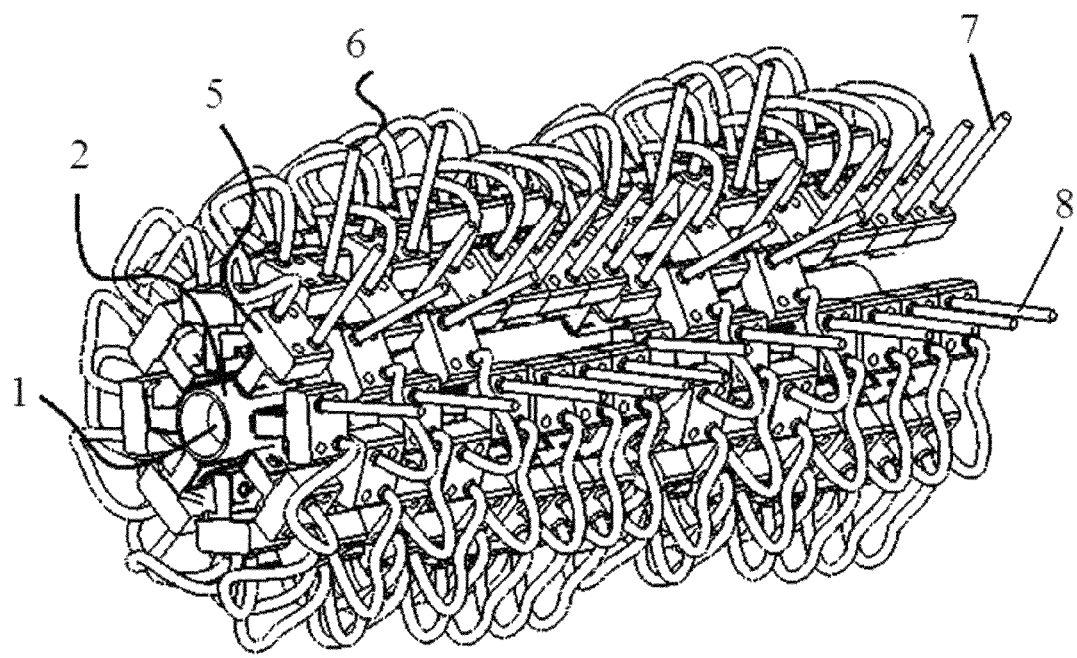
FIG. 5 is a structure view showing that a plurality of pump bar structures with different radii are sleeved on a glass sleeve provided a crystal bar therein.
Figure 6:
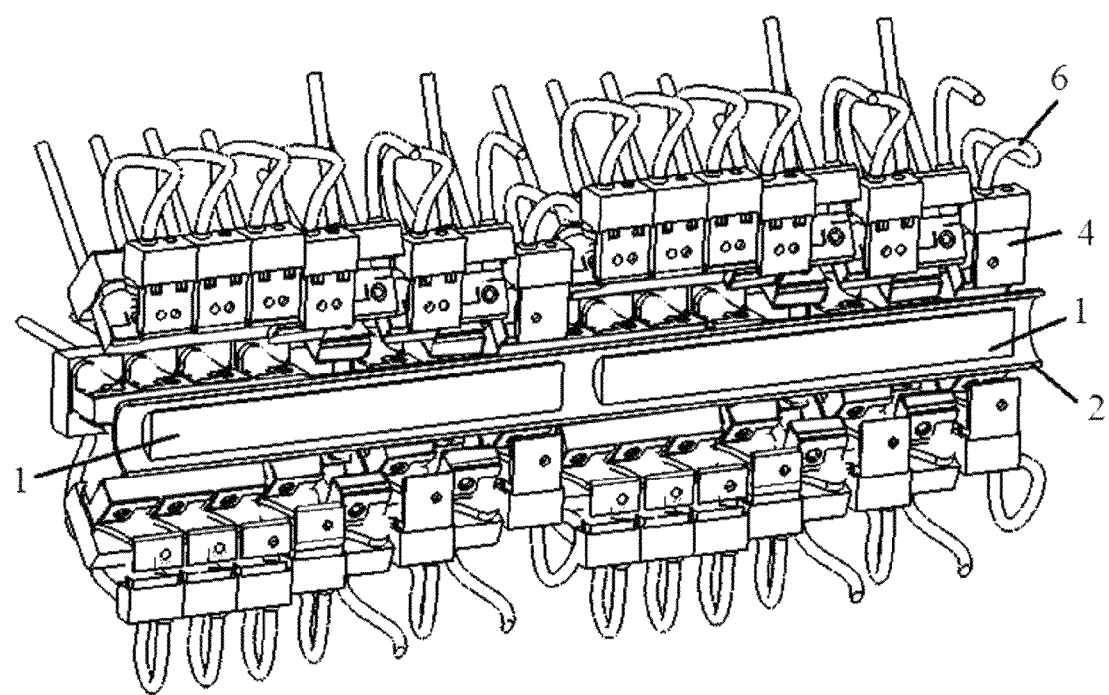
FIG. 6 is a profile showing that a plurality of pump bar structures with different radii are sleeved on a glass sleeve provided a crystal bar therein.
Figure 7:
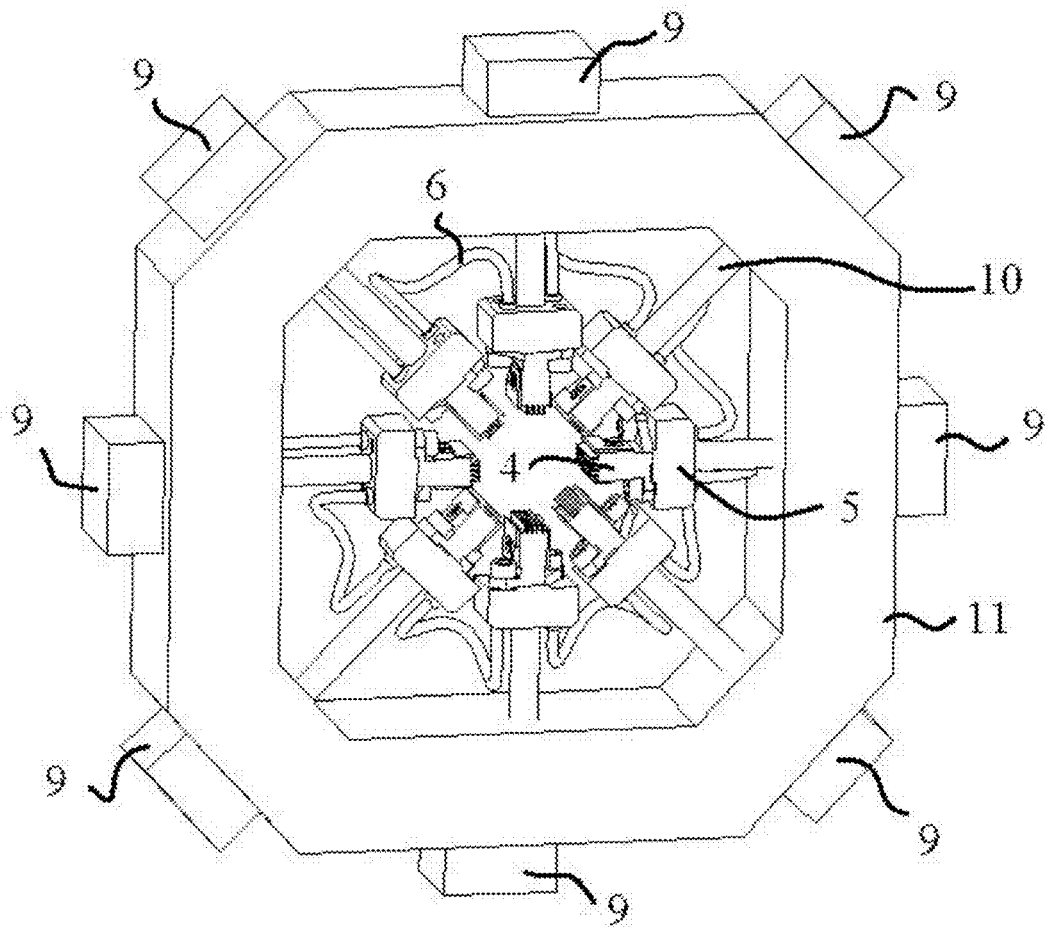
FIG. 7 is a structure view of a pump bar structure including the electric control block.

Reference numerals used in the figures include crystal short bar 1, glass sleeve 2, fixing bump 3, bar 4, cooling heat sink 5, cooling pipe 6, inlet pipe 7, outlet pipe 8, electric control block 9, retractable screw 10, and housing 11.

DETAILED DESCRIPTION OF CERTAIN ILLUSTRATIVE EMBODIMENTS

The disclosure is described below with reference to the specific embodiments and in combination with the accompanying drawings in detail.

Embodiment 1

As Shown in FIG. 2 to FIG. 7

A large aperture uniform-amplification laser module includes a ring-shaped pump bar structure, an electric control block 9, a retractable screw 10, a crystal bar, a glass sleeve 2, and a structural component.

The pump bar structure includes a plurality of pump blocks, and each pump block is composed of a bar 4, a cooling heat sink 5, and a cooling pipe 6. The bar 4 is connected with the cooling heat sink 5, and a cooling water channel is provided inside the cooling heat sink 5. Two of the cooling heat sinks 5 are respectively provided with an outlet pipe 8 and an inlet pipe 7 which are communicated with the cooling water channel. From the cooling heat sink 5 provided with the inlet pipe 7 to the cooling heat sink 5 provided with the outlet pipe 8, a plurality of cooling water channels are connected in series through the a plurality of cooling pipes 6 and form a ring shape. The bar 4 is close to a center axis of the ring-shaped pump bar structure.

The crystal bar is provided in the glass sleeve 2. A plurality of ring-shaped pump bar structures with the same diameter or different diameters are sleeved on the glass sleeve 2 along the length of the glass sleeve 2. The glass sleeve 2 is fixed, through the structural component, at a hollow part which is composed of a plurality of ring-shaped pump bar structures; an adjusting gap is between the outer wall of the glass sleeve 2 and each bar 4 of each pump bar structure.

One end of the retractable screw 10 is rotationally connected with the electric control block 9, and the other end is connected with the cooling heat sink 5. The electric control block 9 rotates, through an electrical signal provided from outside, the retractable screw 10 to adjust the distance between the bar 4 and the crystal bar.

In the large aperture uniform-amplification laser module provided by the disclosed technology, a plurality of pump blocks composed of the bar 4, the cooling heat sink 5 and the cooling pipe 6 are connected to form the ring-shaped pump bar structure. A plurality of ring-shaped pump bar structures with the same diameter or different diameters are sleeved on the glass sleeve 2 loaded with the crystal bar. An adjusting gap is between the glass sleeve 2 and the bar 4 in each ring-shaped pump bar structure. Meanwhile, the electric control block 9 is connected with the cooling heat sink 5. The retractable screw 10 is provided on the electric control block 9. One end of the retractable screw 10 is rotationally connected with the electric control block 9, and the other end is connected with the cooling heat sink 5. The electric control block 9 is fixed through the housing (fixing housing) 11, and rotates, through the electrical signal provided from outside, the retractable screw 10 to adjust the distance between the bar 4 and the crystal bar.

The disclosed technology, in at least some aspects, remedies certain defects generated during growth by adjusting and controlling the distance between the bar 4 and the crystal bar through the electric control block 9, so as to form a small-scale uniform pump between a pump bar structure and a section of crystal bar corresponding to it to further achieve uniform gain output of the laser module.

The relationship (rule) between the distance from the bar 4 to the crystal bar and the pump uniformity characteristic can be determined by optical tracing simulation analyses and experimental tests. For example, for the yttrium aluminium garnet crystal with diameter 15 mm, when the doping concentration is 0.8% and the distance between the bar and the crystal bar is 8 mm, 10 mm, 12 mm and 14 mm, the obtained energy density distribution on a section of the crystal bar is shown in FIG. 1. When the distance is 8 mm, there is an obviously serious energy overlapping bump in the middle; when the distance is 14 mm, and the middle is too sunken.

The disclosed technology, in at least some aspects, realizes the uniform pump in a certain range of absorption coefficient and remedies certain defects generated during growth by controlling and adjusting the distance between the bar 4 and the crystal bar through the electric control block 9 fixed by the housing 11. The disclosed technology achieves precise control of pump uniformity for different injection pump powers over the full range of the crystal bar and the final uniform gain amplification. Thus, the large aperture uniform-amplification laser module provided by the disclosure is capable of using a longer crystal bar with a larger diameter to amplify laser and achieve the aim of uniform gain output.

Embodiment 2

A large aperture uniform-amplification laser module includes a ring-shaped pump bar structure, an electric control block 9, a retractable screw 10, a crystal bar, a glass sleeve 2 and a structural component.

The pump bar structure includes a plurality of pump blocks, and each pump block is composed of a bar 4, a cooling heat sink 5, and a cooling pipe 6. The bar 4 is connected with the cooling heat sink 5, and a cooling water channel is provided inside the cooling heat sink 5. Two of the cooling heat sinks 5 are respectively provided with an outlet pipe 8 and an inlet pipe 7 which are communicated with the cooling water channel; from the cooling heat sink 5 provided with the inlet pipe 7 to the cooling heat sink 5 provided with the outlet pipe 8, a plurality of cooling water channels are connected in series through the a plurality of cooling pipes 6 and form a ring shape. The bar 4 is close to a center axis of the ring-shaped pump bar structure.

The crystal bar is provided in the glass sleeve 2. A plurality of ring-shaped pump bar structures with the same diameter or different diameters are sleeved on the glass sleeve 2 along the length of the glass sleeve 2. The glass sleeve 2 is fixed, through the structural component, at a hollow part composed of a plurality of ring-shaped pump bar structures; an adjusting gap is between an outer wall of the glass sleeve 2 and each bar 4 of each pump bar structure.

One end of the retractable screw 10 is rotationally connected with the electric control block 9, and the other end is connected with the cooling heat sink 5. The electric control block 9 rotates, through an electrical signal provided from outside, the retractable screw 10 to adjust the distance between the bar 4 and the crystal bar.

At least some embodiments include a large aperture uniform-amplification laser module including a plurality of pump blocks composed of the bar 4, the cooling heat sink 5 and the cooling pipe 6 connected to form the ring-shaped pump bar structure. The laser module includes a plurality of ring-shaped pump bar structures with the same diameter or different diameters are sleeved on the glass sleeve 2 loaded with the crystal bar. The laser module also includes an adjusting gap is between the glass sleeve 2 and the bar 4 in each ring-shaped pump bar structure. Meanwhile, the electric control block 9 is connected with the cooling heat sink 5. The retractable screw 10 is provided on the electric control block 9. One end of the retractable screw 10 is rotationally connected with the electric control block 9, and the other end is connected with the cooling heat sink 5. The electric control block 9 is fixed through the housing 11 and rotates, through the electrical signal provided from outside, the retractable screw 10 to adjust the distance between the bar 4 and the crystal bar.

That is to say, certain defects generated during growth can be remedied by adjusting and controlling the distance between the bar 4 and the crystal bar through the electric control block 9, so as to form a small-scale uniform pump between a pump bar structure and a section of crystal bar corresponding to it, and further achieve uniform gain output of the laser module.

The rule between the distance from the bar 4 to the crystal bar and the pump uniformity characteristic can be known from a lot of optical tracing simulation analysis and experimental test; for example, for the yttrium aluminium garnet crystal with diameter 15 mm, when the doping concentration is 0.8% and the distance between the bar and the crystal bar is 8 mm, 10 mm, 12 mm and 14 mm, the obtained energy density distribution on a section of the crystal bar is shown in FIG. 1; when the distance is 8 mm, there is an obviously serious energy overlapping bump in the middle; when the distance is 14 mm, the middle is too sunken.

This disclosure realizes the uniform pump in a certain range of absorption coefficient by controlling the distance between the bar 4 and the crystal bar, and remedies certain defects generated during growth; besides, the distance between the bar 4 and the crystal bar is adjusted through the electric control block 9 fixed by the housing 11 to realize the precise control to uniformity for different injection pump powers, so as to realize the precise control to pump uniformity in the full range of the crystal bar and the final uniform gain amplification. Thus, the large aperture uniform-amplification laser module provided by the disclosure is capable of using a longer crystal bar with a larger diameter to amplify laser and achieve the aim of uniform gain output.

The electrical signal loaded to the electric control block 9 may correspond to a curve fitted by the measured spot uniformity inside a section of crystal, so that the pump uniformity of the module may be adjusted by the external electrical signal, or directly by voltage.

In an embodiment, the glass sleeve 2 is a cylindrical tube.

A plurality of fixing bumps 3 for fixing the crystal bar are provided on an inner wall of the glass sleeve 2, so that a channel for cooling water to flow is formed between the crystal bar and the inner wall of the glass sleeve 2.

To quickly diffuse heat generated between the crystal bar and the glass sleeve diffuse, cooling water may be filled in the glass sleeve 2. Cooling water flows along the channel between the glass sleeve 2 and the crystal bar to take the heat generating therein away.

In an embodiment, a plurality of groups of fixing bumps 3 are provided on the inner wall of the glass sleeve 2 In an embodiment, each group of fixing bumps 3 is arranged on the inner wall of the glass sleeve 2 along the radial direction of the glass sleeve. In an embodiment, each group of fixing bumps 3 is uniformly arranged.

In an embodiment, in order to fix the crystal bar stably and separate the crystal bar from the inner wall of the glass sleeve 2, each group may include three fixing bumps 3 which are uniformly arranged on the inner wall of the glass sleeve 2 along its section. In an embodiment, at least two groups of fixing bumps 3 are provided on the inner wall of each glass sleeve 2.

Stably connecting the glass sleeve 2 with the crystal bar may include fixedly connecting the crystal bar to a plurality of fixing bumps 3, and fixedly connected the plurality of fixing bumps 3 with the inner wall of the glass sleeve 2. In an embodiment, the crystal bar is a crystal long bar which is formed by connecting a plurality of crystal short bars 1. In an embodiment, the plurality of crystal short bars 1 are made by processing a crystal blank along a direction perpendicular to the growth direction of the crystal blank unlike methods of processing a long crystal bar along the growth direction of the crystal blank, for which, in the process of growth, the doping concentration of two ends of the crystal blank gradually rises as the length increases when the crystal bar is processed along the growth direction of the crystal blank. Therefore, the doping concentration of two ends of the crystal bar is higher when processing a long crystal bar along the growth direction of the crystal bank.

To reduce the doping concentration gradient of the crystal bar, the crystal bar may be produced along a direction perpendicular to the growth direction of the crystal blank. The crystal bar is processed along the section of the crystal blank; thus, the doping concentration gradient of each processed shorter crystal bar is smaller. Ends of the processed plurality of crystal short bars 1 are interconnected to form a long crystal bar. This long crystal bar is included in the large aperture uniform-amplification laser module presented in the disclosed technology. The relationship of absorption coefficient between the radius of each pump bar structure and the crystal short bar 1 can be precisely matched, and the pump bar structures with different diameters are respectively provided around each crystal short bar 1 to achieve a small range of uniform pump, so that the whole uniform pump gain output of the long crystal bar is achieved.

When the plurality of crystal short bars 1 are connected, an antireflection film may be provided on a connection surface of two adjacent crystal short bars 1, or the two adjacent crystal short bars are connected by bonding.

In an embodiment, the large aperture uniform-amplification laser module further includes an acquiring system, electrically connected with the crystal bar, for a spot output signal.

In an embodiment, the large aperture uniform-amplification laser module further includes an acquiring system for a spot signal output by the crystal bar; the acquiring system and the laser module transmit information to each other through the electrical signal.

In an embodiment, the added acquiring system can acquire the energy signal on the section of crystal bar in real time and display it on a test screen. In an embodiment, the distance between the bar 4 and the crystal bar is further adjusted by the electric control block 9 and a auger screw in response to an energy density distribution on the section of the crystal bar, which is displayed on the test screen in real time, so as to adjust to an optimum state of the distance between the bar 4 and the crystal bar. Through the introduction of an electric adjusting system, an amplifying module may not only form amplification the fixed input signal light with the uniformity not more than 20%, but also adapt to a change in energy density of the amplified light beam, thereby ensuring the consistency of output uniformity of the amplified light beam under conditions of different injection signal lights.

Experimental Example 1

A large aperture uniform-amplification laser module, according to the disclosed technology, was made with reference to FIG. 2 to FIG. 6. The laser module includes a crystal bar with a composite structure of 8 crystal short bars, each with a length of 90 mm and a diameter of 10 mm, made of yttrium aluminium garnet bar stock grown using the Czochralski method along the X axis.

Two (2) crystal short bars with similar doping concentration were selected from the 8 crystal short bars. The doping concentration of one end of the first crystal short bar is 0.6%, and that of the other end is 0.74%; the doping concentration of one end of the second crystal short bar is 0.63%, and that of the other end is 0.79%.

Then, the pump bar structures were made, each including 8 pump blocks and 8 groups of pump bar structures arranged around each crystal short bar.

The resulting laser module was tested and analyzed, including matching the precise relationship between the doping concentration and the distance with the following results.

The diameters of the first group of pump bar structures which are arranged in a circle along the first crystal short bar are respectively: 14.0 mm, 14.6 mm, 14.6 mm, 15.9 mm, 15.9 mm, 17.1 mm, 17.1 mm and 17.1 mm.

The diameters of the second group of pump bar structures which are arranged in a circle along the second crystal short bar are respectively: 14.3 mm, 14.9 mm, 14.9 mm, 16.3 mm, 16.3 mm, 18.0 mm, 18.0 mm and 18.0 mm.

The 8 pump bar structures in each group are respectively fixed connected with a crystal short bar matching with each pump bar structure; they are arranged crisscross, with the pump aiming at a section of crystal short bar.

This experiment includes 2 sections of crystal short bar, which are arranged coaxially. Two sides of each section are coated with the antireflection films of 1064 nm, so that uniform pump is achieved by adjusting pump distance.

The glass sleeve for cooling water to flow is provided outside of the crystal bar with a composite structure composed of two crystal short bars. The external diameter of the glass sleeve is 16 mm, and inner diameter is 14 mm. 4 groups, each of which includes 3 support bumps, are provided inside of the glass sleeve with composite structure by sintering. The 12 support bumps separate the connected long crystal bar from the inner wall of the glass sleeve to form a water channel for cooling the crystal bar.

In an embodiment, a large aperture uniform-amplification laser module can be made by fixing the crystal bar with a composite structure, the glass sleeve, and the pump bar structure through the structural component, and connecting the cooling water channels in a general division pattern.

The large aperture uniform-amplification laser module provided in the experimental example reduces the fluctuation of energy density on radial section of the crystal bar to less than 20%, from more than 100% fluctuation of energy density for existing laser modules that lack the compensation described in the disclosed technology.

Experimental Example 2

A large aperture uniform-amplification laser module according to the disclosed technology was made with reference to FIG. 2 to FIG. 6. The laser module includes a crystal bar with a composite structure of 30 crystal short bars, each with length of 25 mm and diameter of 13 mm, made of the yttrium aluminium garnet bar stock grown using the Czochralski method along the Y axis.

Six (6) crystal short bars with similar doping concentration were selected from the 30 crystal short bars. The doping concentration of one end of the 6 crystal short bars is 0.5±0.05%, and that of the other end is 0.7±0.05%. The 6 crystal short bars were connected by bonding to form the crystal bar with composite structure.

Then, the pump bar structures were made, each composed of 5 pump blocks, and 3 groups of pump bar structures were arranged around each crystal short bar.

The resulting laser module was tested and analyzed, including matching the precise relationship between the doping concentration and the distance with the following results.

The diameters of the pump bar structures which are arranged in a circle along the crystal short bar are respectively: 12.0 mm, 12.3 mm, 12.6 mm and 13.1 mm. The 4 pump bar structures are taken as a loop to perform 6 times of periodic arrangement. Two sides of the crystal bar with composite structure in the present embodiment are coated with antireflection films of 1064 mm.

The glass sleeve for cooling water to flow is provided outside of the crystal bar with a composite structure. The external diameter of the glass sleeve is 19 mm, and inner diameter is 15 mm. A water channel for cooling the crystal bar is formed between the outer wall of the crystal bar with composite structure and the inner wall of the glass sleeve. The crystal bar with composite structure is fixed through rubber ring with two sections.

In an embodiment, a large aperture uniform-amplification laser module described in the disclosed technology may be formed by fixing the crystal bar with the composite structure, the glass sleeve, and the pump bar structure through the structural component, and connecting the cooling water channels in a general division pattern. By making the crystal bar with a composite structure and applying the crystal bar with a composite structure to the large aperture uniform-amplification laser module, the drift of the absorption coefficient in the crystal bar could be further reduced, and the fluctuation of energy density after pumping is less than 8%.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the invention described herein can be embodied within a form that does not provide all of the features and benefits set forth herein, as some features can be used or practiced separately from others. The scope of the invention disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

What is claimed is:

1. A large aperture uniform-amplification laser module, comprising:
   a ring-shaped pump bar structure;
   a crystal bar;
   a glass sleeve;
   a structural component,
   wherein the pump bar structure comprises a plurality of pump blocks, and each pump block is composed of a bar, a cooling heat sink, and a cooling pipe, wherein the bar is connected with the cooling heat sink, and a cooling water channel is provided inside of the cooling heat sink, wherein two of the cooling heat sinks are respectively provided with an outlet pipe and an inlet pipe which are communicated with the cooling water channel, wherein from the cooling heat sink provided with the inlet pipe to the cooling heat sink provided with the outlet pipe, a plurality of the cooling water channels are connected in series through a plurality of the cooling pipes and form a ring shape, wherein the bar is close to a center axis of the ring-shaped pump bar structure,
   wherein the crystal bar is provided in the glass sleeve, wherein a plurality of the ring-shaped pump bar structures with the same diameter or different diameters are sleeved on the glass sleeve along the length of the glass sleeve, wherein the glass sleeve is fixed, through the structural component, at a hollow part which is composed of a plurality of the ring-shaped pump bar structures, wherein a gap is between an outer wall of the glass sleeve and each bar of each pump bar structure,
   wherein each pump block is correspondingly provided with an electric control block and a retractable screw, wherein the cooling heat sink in the pump block is connected with the electric control block through the retractable screw, wherein the electric control block controls, according to an electrical signal provided from outside, the rotation of the retractable screw to adjust the distance between the bar and the crystal bar; and
   a housing for respectively fixing each electric control block.

2. The laser module of claim 1, wherein the glass sleeve is a cylindrical tube.

3. The laser module of claim 1, further comprising:
   a plurality of fixing bumps for fixing the crystal bar provided on an inner wall of the glass sleeve; and
   a channel for cooling water to flow provided between the crystal bar and the inner wall of the glass sleeve.

4. The laser module of claim 3, wherein a plurality of groups of fixing bumps are provided on the inner wall of the glass sleeve, each group comprising three fixing bumps, and each group of fixing bumps is uniformly arranged on the inner wall of the glass sleeve along the radial direction of the glass sleeve.

5. The laser module of claim 3, wherein each fixing bump is fixedly connected with the inner wall of the glass sleeve.

6. The laser module of claim 1, wherein the crystal bar is a crystal long bar which is formed by connecting a plurality of crystal short bars, wherein the plurality of crystal short bars are made by processing a crystal blank along a direction perpendicular to the growth direction of the crystal blank.

7. The laser module of claim 6, further comprising an antireflection film provided on a connection surface of two adjacent crystal short bars.

8. The laser module of claim 6, wherein two adjacent crystal short bars are connected by bonding.

9. The laser module of claim 6, further comprising an acquiring system for a spot signal output by the crystal bar, wherein the acquiring system and the laser module transmit information to each other through the electrical signal.

10. The large aperture uniform-amplification laser module according to claim 1, wherein a plurality of the housings are connected with each other to form a closed ring shape.

* * * * *

UNITED STATES PATENT AND TRADEMARK OFFICE
CERTIFICATE OF CORRECTION

PATENT NO. : 9,559,481 B2  
APPLICATION NO. : 15/076902  
DATED : January 31, 2017  
INVENTOR(S) : Zhongwei Fan et al.

Page 1 of 1

It is certified that error appears in the above-identified patent and that said Letters Patent is hereby corrected as shown below:

In the Specification

In Column 4 at Line 3, Change "the a" to --a--.

In Column 5 at Line 21, Change "the a" to --a--.

In Column 6 at Line 37, After "2" insert --.--.

Signed and Sealed this
Tenth Day of April, 2018

Andrei Iancu
*Director of the United States Patent and Trademark Office*